United States Patent

Kumazaki et al.

(10) Patent No.: US 7,909,582 B2
(45) Date of Patent: Mar. 22, 2011

(54) VEHICULAR OIL PUMP CONTROL APPARATUS

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 432 days.

(21) Appl. No.: 12/076,736

(22) Filed: Mar. 21, 2008

(65) Prior Publication Data

US 2008/0240941 A1 Oct. 2, 2008

(30) Foreign Application Priority Data

Apr. 2, 2007 (JP) ................................ 2007-096930

(51) Int. Cl.
*F04B 23/04* (2006.01)
*B60W 10/30* (2006.01)
(52) U.S. Cl. ....... 417/2; 417/199.1; 417/426; 180/65.27
(58) Field of Classification Search ................ 417/2, 10, 417/34, 199.1, 426; 180/65.27, 65.275
See application file for complete search history.

(56) References Cited

U.S. PATENT DOCUMENTS

| 2003/0109970 A1* | 6/2003 | Nakamori et al. ............. 701/22 |
| 2003/0148850 A1* | 8/2003 | Tomohiro et al. ................ 477/3 |
| 2006/0070943 A1 | 4/2006 | Nishiyama et al. |

FOREIGN PATENT DOCUMENTS

| JP | A-08-166058 | 6/1996 |
| JP | A-2001-41067 | 2/2001 |
| JP | A-2002-340160 | 11/2002 |
| JP | A-2004-067001 | 3/2004 |
| JP | A-2005-289316 | 10/2005 |
| JP | A-2006-105294 | 4/2006 |
| JP | A-2006-161838 | 6/2006 |

* cited by examiner

*Primary Examiner* — Devon C Kramer
*Assistant Examiner* — Philip Stimpert
(74) *Attorney, Agent, or Firm* — Oliff & Berridge, PLC

(57) ABSTRACT

A control apparatus for controlling two oil pumps which are provided on a vehicle wherein the two oil pumps are selectively driven by respective different drive power sources such that one of the two oil pumps is operated while the other oil pump is held at rest, the control apparatus including an air removal control portion configured to temporarily operate the above-indicated other oil pump during an operation of the above-indicated one oil pump, to remove air staying at and around an oil inlet of the above-indicated other oil pump.

5 Claims, 9 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | | | | | | | | | |

○ ENGAGED

◎ ENGAGED FOR STEP-VARIABLE SHIFTING, AND RELEASED FOR CONTINUOUSLY-VARIABLE SHIFTING

FIG.9
$$Q_a = \int_0^T K \cdot Q_e \cdot N(t) \cdot dt \cdots (1)$$
$$Q_a \leqq Q_{amax} \cdots (2)$$
FIG.10
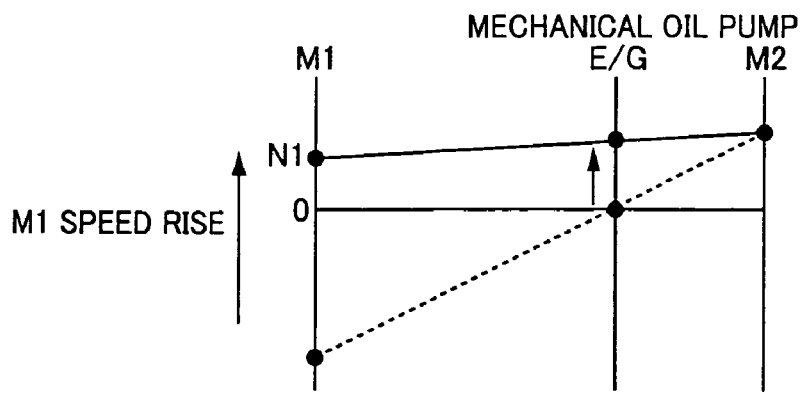
FIG.11
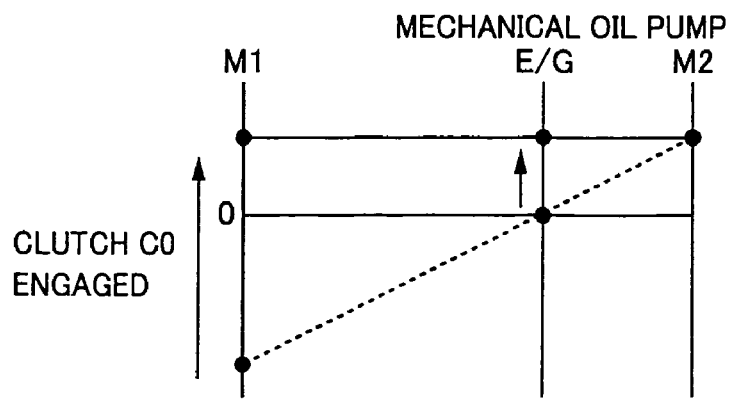

VEHICULAR OIL PUMP CONTROL APPARATUS

The present application claims priority from Japanese Patent Application No. 2007-096930 filed Apr. 2, 2007, the disclosure of which is herein incorporated by reference in its entirety.

BACKGROUND OF THE INVENTION

1. Field of the Invention

The present invention relates in general to a control apparatus for an oil pump provided on a vehicle, and more particularly to techniques for improving characteristics of a rise of a hydraulic pressure which is generated by one of two oil pumps driven by respective two different drive power sources upon switching from the other oil pump to the above-indicated one oil pump.

2. Discussion of Prior Art

There is known a control apparatus for controlling two oil pumps that are selectively driven by respective two different drive power sources such that one of the two oil pumps is operated while the other oil pump is held at rest. For example, a motor vehicle is provided with a mechanical oil pump driven by an engine, and an electric oil pump driven by an electric energy supplied from a battery. In this type of vehicle, the mechanical oil pump is operated during an operation of the engine, and the electric oil pump is operated while the engine is at rest. JP-2001-41067A discloses techniques for improving characteristics of a rise of a hydraulic pressure generated by the electric oil pump, by starting the electric oil pump prior to stopping of the engine upon switching from the mechanical oil pump to the electric oil pump. JP-2006-161837A discloses techniques for improving the characteristics of the hydraulic pressure rise of the electric oil pump, by operating the electric oil pump for a predetermined short time prior to stopping of the engine, for thereby stirring and removing air staying at and around an oil inlet of the electric oil pump, upon switching from the mechanical oil pump to the electric oil pump.

In oil pump systems wherein the mechanical oil pump and the electric oil pump are selectively driven, as disclosed in the above-identified publications JP-2001-41067A and JP-2006-161837A, air tends to easily stay at and around the oil inlet of the mechanical oil pump while the electric oil pump is operated to generate the hydraulic pressure. If the mechanical oil pump is driven by the engine in the presence of the air, the air is sucked into the mechanical oil pump, giving rise to a risk of a delayed rise of the hydraulic pressure generated by the mechanical oil pump. Although JP-2006-161838A discloses the techniques for improving the characteristics of the hydraulic pressure rise of the electric oil pump by removing the air staying at and around the oil inlet upon switching from the mechanical oil pump to the electric oil pump, there are known no techniques for removing the air staying at and around the mechanical oil pump upon switching from the electric oil pump to the mechanical oil pump.

SUMMARY OF THE INVENTION

The present invention was made in view of the background art described above. It is therefore an object of the present invention to provide a control apparatus for controlling two oil pumps provided on a vehicle and selectively driven by respective two different drive power sources, which control apparatus assures an improvement of characteristics of a rise of a hydraulic pressure generated by one of the two oil pumps upon switching from the other oil pump to the above-indicated one oil pump.

The object indicated above may be achieved according to any one of the following modes of this invention, each of which is numbered and depends from the other mode or modes, where appropriate, to indicate and clarify possible combinations of elements or technical features. It is to be understood that the present invention is not limited to the technical features or any combination thereof which will be described for illustrative purpose only.

(1) A control apparatus for controlling two oil pumps which are provided on a vehicle wherein the two oil pumps are selectively driven by respective different drive power sources such that one of the two oil pumps is operated while the other oil pump is held at rest, the control apparatus comprising an air removal control portion configured to temporarily operate the above-indicated other oil pump during an operation of the above-indicated one oil pump, to remove air staying at and around an oil inlet of the above-indicated other oil pump.

According to the control apparatus constructed according to the above-described mode (1) of the present invention, the above-indicated other oil pump is temporarily operated under the control of the air removal control portion, during an operation of the above-indicated one oil pump, so that the air staying at and around the oil inlet of the above-indicated other oil pump is removed. Accordingly, the hydraulic pressure generated by the above-indicated other oil pump after stopping of the above-indicated one oil pump and starting of the above-indicated other oil pump can be rapidly raised with a high degree of response.

(2) The control apparatus according to the above-described mode (1), wherein the air removal control portion is configured to initiate a temporary rise of an operating speed of the above-indicated other oil pump when an amount of an oil sucked by the above-indicated one oil pump has reached a predetermined value.

In the above-described mode (2) of the present invention, the temporary rise of the operating speed of the above-indicated other oil pump is initiated when the amount of the oil sucked by the above-indicated one oil pump in operation has reached the predetermined value, that is, the quantity of the air staying at and around the oil inlet of the above-indicated other oil pump has increased to a predetermined value. In this respect, it is noted that the quantity of the air staying at and around the oil inlet of the above-indicated other oil pump can be estimated on the basis of the amount of the oil sucked by the above-indicted one oil pump. The control apparatus according to this mode (2) permits efficient removal of the air.

(3) The control apparatus according to the above-described mode (1) or (2), wherein the above-indicated one oil pump is an electric oil pump driven by an electric energy.

In the above-described mode (3) of this invention, the quantity of the air staying at and around the oil inlet of the above-indicated other oil pump can be estimated on the basis of the amount of the oil sucked by the electric oil pump driven by the electric energy.

(4) The control apparatus according to any one of the above-described modes (1)-(3), wherein the above-indicated other oil pump is a mechanical oil pump driven by an engine of the vehicle.

In the above-described mode (4) of the invention, the operating speed of the mechanical oil pump is temporarily raised to remove the air staying at and around its oil inlet.

(5) The control apparatus according to the above-described mode (4), further comprising an engine-start requirement forecasting portion configured to forecast a requirement for starting the engine, and wherein the air removal control portion initiates a temporary rise of an operating speed of the above-indicated other oil pump when the engine-start requirement forecasting portion has forecasted the requirement.

In the above-described mode (5) of the invention, the temporary rise of the operating speed of the mechanical oil pump is initiated to remove the air staying at and around its oil inlet, when the engine-start requirement is forecasted by the engine-start requirement forecasting portion, that is, before the engine is started. Accordingly, the hydraulic pressure generated by the mechanical oil pump can be rapidly raised immediately after starting of the mechanical oil pump.

(6) The control apparatus according to the above-described mode (4) or (5), wherein the vehicle includes an electrically controlled differential portion having an input shaft, an output shaft, a differential mechanism operatively connected to the engine, and an electric motor which is operatively connected to a rotary element of the differential mechanism and an operating state of which is controlled to control a differential state between rotating speeds of the input and output shafts, and wherein the air removal control portion is configured to operate the electric motor to raise an operating speed of the mechanical oil pump.

In the above-described mode (6) of the instant invention, the mechanical oil pump can be temporarily operated by the engine which is operated by the electric motor, without starting of the engine, that is, in a fuel-cut state of the engine.

(7) The control apparatus according to the above-described mode (6), wherein the differential mechanism is provided with a differential limiting device operable to limit or inhibit a differential function of the differential mechanism, and the air removal control portion is configured to enable the differential limiting device to operate for raising the operating speed of the mechanical oil pump.

In the above-described mode (7) of this invention, the mechanical oil pump can be temporarily operated by the engine which is operated by the electric motor under the control of the differential limiting device, without starting of the engine.

(8) The control apparatus according to the above-described mode (7), wherein the electrically controlled differential portion is placed in a continuously-variable shifting state while the differential mechanism is placed by the differential limiting device in a differential state in which the differential mechanism performs the differential function, and in a step-variable shifting state while the differential mechanism is placed by the differential limiting device in a locked state in which the differential mechanism does not perform the differential function In the above-described mode (8) of the invention, the electrically controlled differential portion is placed in a selected one of the continuously-variable and step-variable shifting states.

(9) The control apparatus according to any one of the above-described modes (6)-(8), wherein the differential mechanism is constituted by a planetary gear set.

In the above-described mode (9) of the invention, the axial dimension of the differential mechanism can be reduced, and the differential mechanism can be simplified in construction.

(10) The control apparatus according to the above-described mode (9), wherein the planetary gear set is a single-pinion type planetary gear set.

In the above-described mode (10) of the invention, the differential mechanism can be more simplified in construction, with a reduced axial dimension.

BRIEF DESCRIPTION OF THE DRAWINGS

The above and other objects, features, advantages, and industrial and technical significance of this invention will be better understood by reading the following detailed description of a preferred embodiment of the invention, when considered in connection with the following drawings, in which:

FIG. 9 is a view indicating an equation (1) for obtaining a quantify of air staying at and around a mechanical oil pump provided in the transmission mechanism, and a formula (2) indicating a condition for temporarily operating the mechanical oil pump;

FIG. 10 is a collinear chart corresponding to that of FIG. 3, indicating an operation of the mechanical oil pump while a first electric motor is operated;

FIG. 11 is a collinear chart indicating an operation of the mechanical oil pump while a switching clutch C0 is placed in an engaged state;

DETAILED DESCRIPTION OF PREFERRED EMBODIMENT

Figures 1, 2:
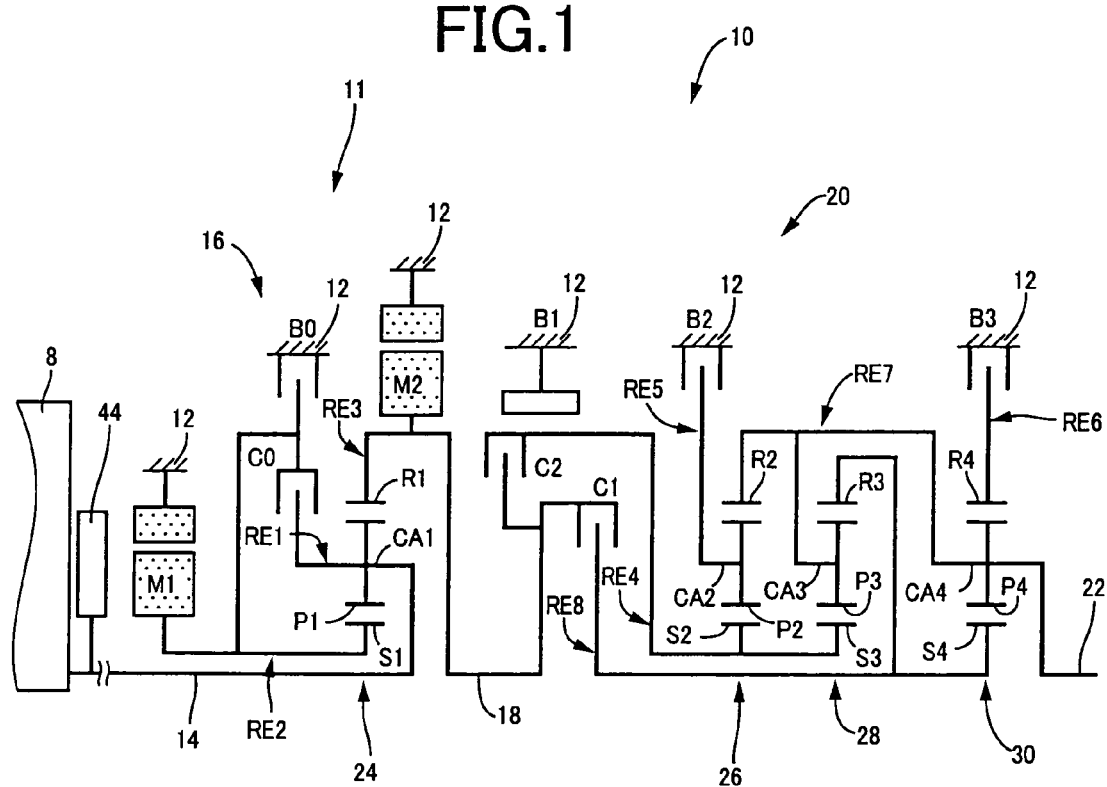
FIG. 1 is a schematic view showing an arrangement of a drive system (transmission mechanism) of a hybrid vehicle, to which the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 6:
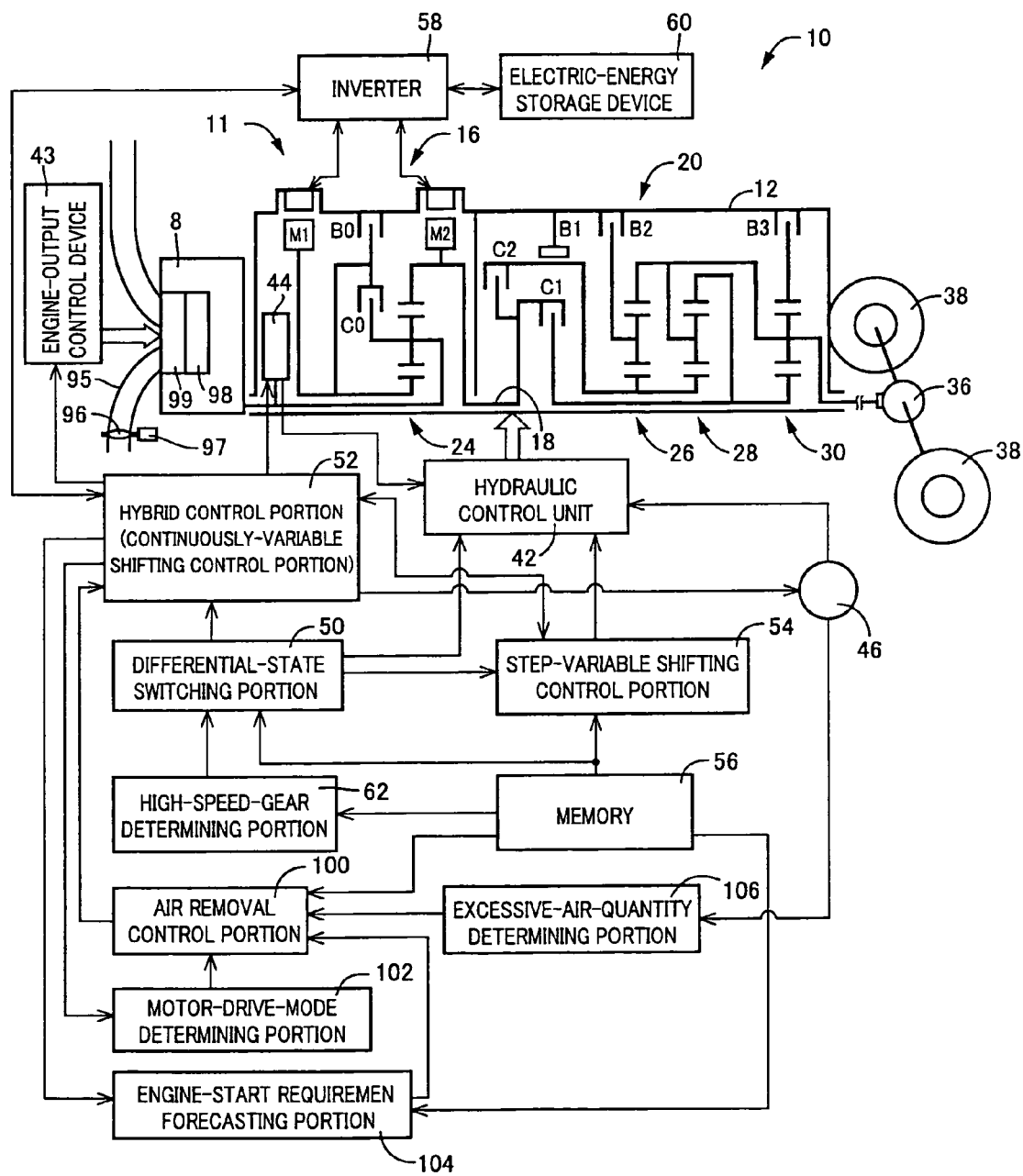
FIG. 6 is a functional block diagram illustrating major control functions of the electronic control device of FIG. 4.

Referring first to the schematic view of FIG. 1, there is shown a transmission mechanism 10 constituting a part of a drive system for a hybrid vehicle, which drive system is controlled by a control apparatus constructed according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 (shown in FIG. 6) of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device (final speed reduction gear) 36 and a pair of drive axles, as shown in FIG. 6. The engine 8 may be a gasoline engine or diesel engine and functions as a vehicle drive power source directly connected to the input shaft 14 or indirectly via a pulsation absorbing damper.

In the transmission mechanism 10 described above, the engine 8 and the differential portion 11 are connected in series with each other, without a torque converter, a fluid coupling or any other power transmitting device being interposed therebetween. However, the series connection of the engine 8 and the differential portion 11 does not exclude the provision of the pulsation absorbing damper therebetween. In the schematic view of FIG. 1, a lower half of the transmission mechanism 10 is omitted, since the transmission mechanism 10 is constructed symmetrically with respect to its axis.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force. In the present embodiment, the differential portion 11 functions as an electrically controlled differential portion, while the first electric motor M1 functions as an electric motor.

The power distributing mechanism 16 includes, as major components, a first planetary gear set 24 of a single pinion type having a gear ratio $\rho 1$ of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1. In the present embodiment, the power distributing mechanism 16 functions as a differential mechanism.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (the power distributing mechanism 16) is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0 \min$ to a maximum value $\gamma 0 \max$, that is, in the continuously-variable shifting state in which the differential portion 11 functions as an electrically controlled continuously variable transmission the speed ratio $\gamma 0$ of which is continuously variable from the minimum value $\gamma 0 \min$ to the maximum value $\gamma 0 \max$. In other words, the differential state between the rotating speeds of the input shaft 14 connected to the engine 8 and the rotating speed of the power transmitting member 18 connected to the second electric motor M2 is controlled by controlling the operating states of the engine 8, first electric motor M1 and second electric motor M2. In the present embodiment, the power transmitting member 18 functions as the output shaft of the differential portion 11.

When the switching-clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma 0$ equal to 1. When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in a second non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7. In the present embodiment, the switching clutch C0 and the switching brake B0 cooperate to function as a differential limiting device operable to limit or inhibit a differential function of the differential mechanism in the form of the power distributing mechanism 16.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through one of the first and second clutches C1, C2 that are used to shift the automatic transmission portion 20. In other words, the first and second clutches C1, C2 function as coupling devices operable to place a power transmitting path between the power transmitting member 18 and the automatic transmission portion 20, that is, a power transmitting path between the differential portion 11 (power transmitting member 18) and the drive wheels 38, selectively in one of a power transmitting state in which power can be transmitted through the power transmitting path, and a power cut-off state in which power cannot be transmitted therethrough. Namely, the power transmitting path is placed in the power transmitting state when at least one of the first and second clutches C1, C2 is engaged, and in the power disconnecting state when both of the first and second clutches C1, C2 are released.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neutral position is selectively established by engaging actions of a corresponding combination of the two frictional coupling devices selected from the above-described first clutch C1, second clutch C2, first brake B1, second brake B2 and third brake B3, as indicated in the table of FIG. 2. The above-indicated positions have respective speed ratios γT (input shaft speed $N_{IN}$/ Output shaft speed $N_{OUT}$) which change as geometric series. In the present embodiment, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected one of the first, second, third and fourth gear positions, namely, the rotating speed of the power transmitting member 18 is continuously changed, so that the speed ratio of the drive system when the automatic transmission portion 20 is placed in the selected gear position is continuously variable over a predetermined range. Accordingly, the overall speed ratio γT of the transmission mechanism 10 determined by the speed ratio γ0 of the differential portion 11 and the speed ratio γ of the automatic transmission portion 20 is continuously variable.

Figure 3:
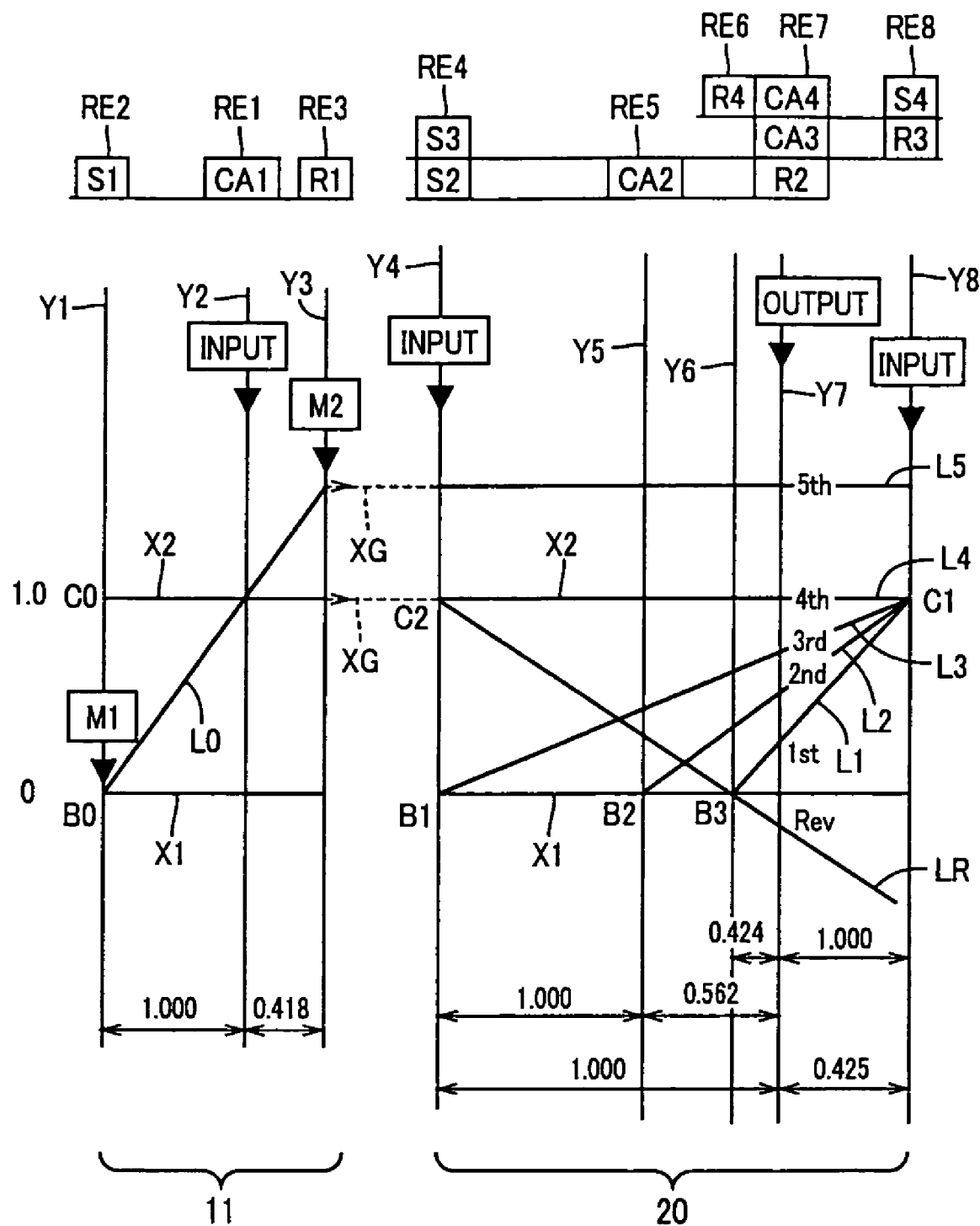
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (step-variable transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio γ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2 is raised or lowered. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the straight line L0 is aligned with the horizontal line X2, and the power transmitting member 18 is rotated at a speed equal to the engine speed $N_E$. When the switching brake B0 is engaged, on the other hand, the rotary motion of the first sun gear S1 is stopped, and the power distributing mechanism 16 is placed in the non-differential state in which the power distributing mechanism 16 functions as a speed increasing mechanism, so that the straight line L0 is inclined in the state indicated in FIG. 3, whereby the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
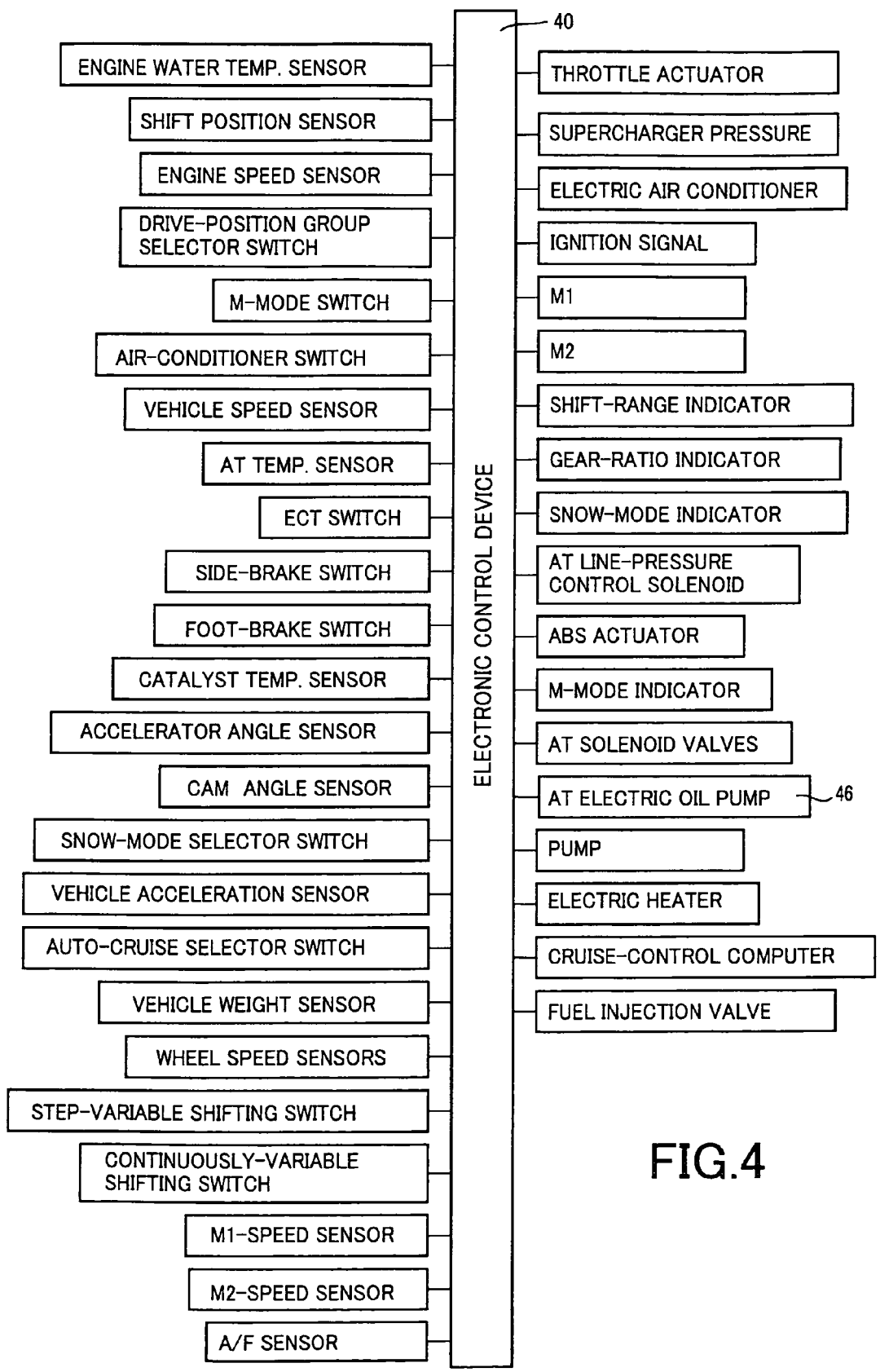
FIG. 4 is a view indicating input and output signals of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever 49 (shown in FIG. 5); a signal indicative of the operating speed $N_E$ of the engine 8; a signal indicative of a value indicating a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the fixed-speed-ratio shifting state in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an air/fuel (A/F) ratio of the engine 8.

The electronic control device 40 is further arranged to generate various signals such as: a drive signal to drive a throttle actuator 97 for controlling an angle of opening $\theta_{TH}$ of an electronic throttle valve 96 disposed in an intake pipe 95 of the engine 8; a fuel injection amount signal to control an amount of injection of a fuel by a fuel injecting device 98 into cylinders of the engine 8; an ignition signal to be applied to an ignition device 99 to control the ignition timing of the engine 8; a supercharger pressure adjusting signal for adjusting a supercharger pressure of the engine 8; an air conditioner drive signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; valve drive signals to operate solenoid-operated valves incorporated in a hydraulic control unit 42 (shown in FIG. 6) provided to control the hydraulic actuators of the hydraulically operated frictional coupling devices of the differential portion 11 and automatic transmission portion 20; a drive signal to operate an electric oil pump 46 used as a hydraulic pressure source for the hydraulic control unit 42; a signal to drive an electric heater; and a signal to be applied to a cruise-control computer. The above-indicated throttle actuator drive signal, fuel injection amount signal, ignition signal and supercharger pressure signal are applied to an engine-output control device 43 (shown in FIG. 6).

Figure 5:
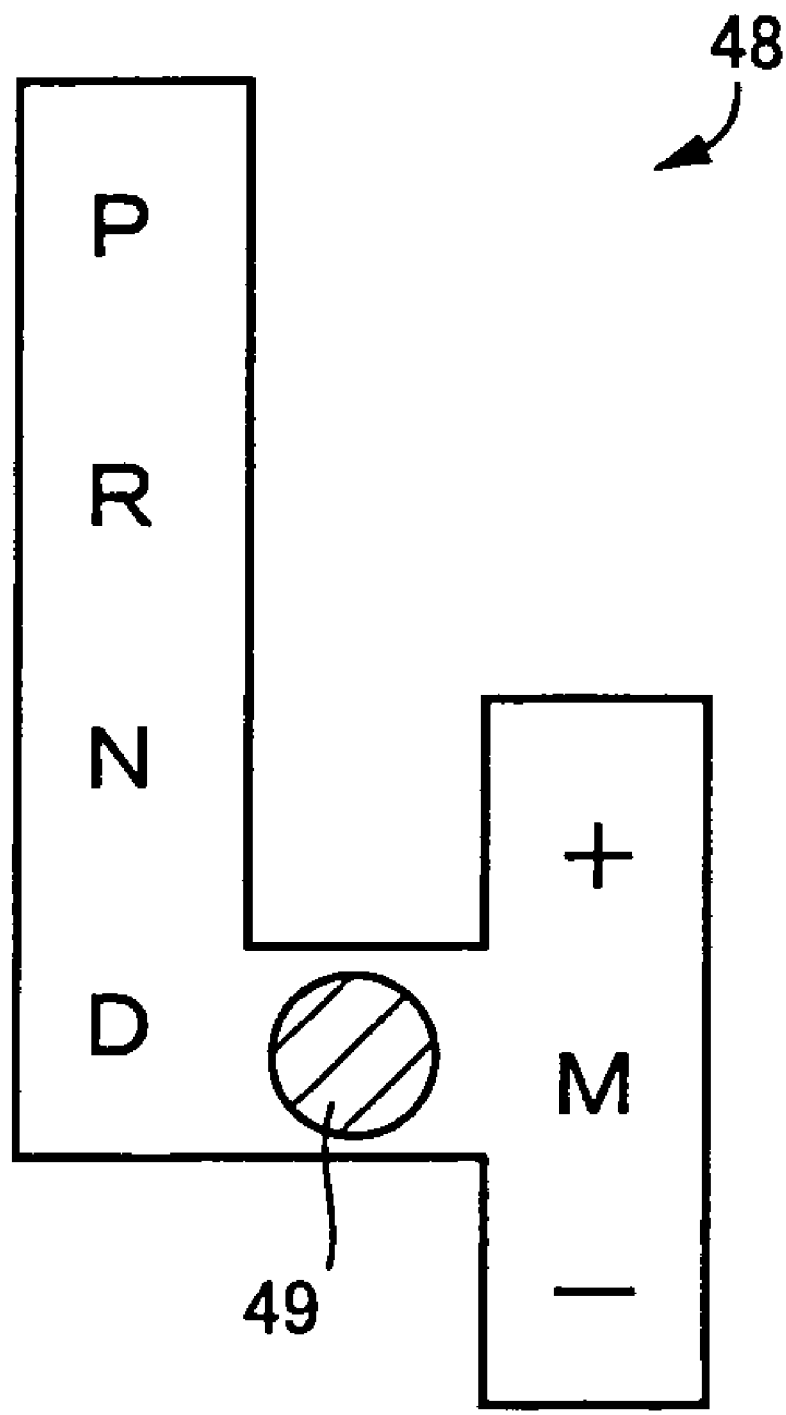
FIG. 5 is a view showing an example of a manually operated shifting device including a shift lever and operable to select one of a plurality of shift positions.

FIG. 5 shows an example of a manually operable shifting device in the form of a shifting device 48. The shifting device 48 includes the above-described shift lever 49, which is disposed laterally adjacent to an operator's seat, for example, and which is manually operated to select one of a plurality of shift positions $P_{SH}$.

The shift positions $P_{SH}$ consist of a parking position P for placing the transmission mechanism 10 (more precisely, the automatic transmission portion 20) in a neutral state in which the power transmitting path is disconnected and in which the output shaft 22 of the automatic transmission portion 20 is locked; a reverse R for driving the vehicle in the rearward direction; a neutral position N for placing the transmission mechanism 10 in the neutral state; an automatic forward-drive shifting position D; and a manual forward-drive shifting position M. When the shift lever 49 is operated to the automatic forward-drive shifting position D, the transmission mechanism 10 is placed in an automatic shifting mode in which the overall speed ratio γT is automatically changed and is defined by the continuously variable speed ratio of the differential portion 11 and the speed ratio of an automatically selected one of the first through fifth gear positions of the automatic transmission portion 20. When the shift lever 49 is operated to the manual forward-drive shifting position M, the transmission mechanism 10 is placed in a manual shifting mode in which the highest gear position to which the automatic transmission portion 20 is automatically shiftable can be selected by operating the shift lever 49 from the manual forward-drive shifting position M to a position "+" or a position "−". That is, the automatically selectable gear positions of the automatic transmission portion 20 can be selected in the manual shifting mode.

When the shift lever 49 is operated to a selected one of the shift positions $P_{SH}$, the hydraulic control unit 42 is electrically switched to establish one of the reverse-drive position R, neutral position N and first through fifth gear positions that are indicated in the table of FIG. 2.

The above-indicated parking position P and the neutral position N of the shift lever 49 are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 49 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 49 from the neutral position N to the automatic forward-drive position D causes at least the first clutch C1 to be engaged for switching the power transmitting path in the automatic transmission portion 20 from the power-cut-off state to the power transmitting state. Further, a manual operation of the shift lever 49 from the reverse-drive position R to the parking position P or neutral position N causes the second clutch C2 to be released for switching the power transmitting path in the automatic transmission portion 20 from the power transmitting state to the power cut-off state. A manual operation of the shift lever 49 from the automatic forward-drive shifting position D to the neutral position N causes the first and second clutches C1, C2 to be released for switching the power transmitting path in the automatic transmission portion 20 from the power transmitting state to the power cut-off state.

FIG. 6 is a functional block diagram for explaining major control functions of the control apparatus in the form of the electronic control device 40, which functions as a vehicular oil pump control apparatus constructed according to the present embodiment of the invention. The electronic control device 40 includes a differential-state switching portion 50, a hybrid control portion 52, a step-variable shifting control portion 54, a memory 56, a high-speed-gear determining portion 62, an air removal control portion 100, a motor-drive-mode determining portion 102, an engine-start requirement forecasting portion 104, and an excessive-air-quantity determining portion 106. The step-variable shifting control portion 54 shown in FIG. 6 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque Tour of the automatic transmission portion 20, and according to a shifting boundary line map (shifting control map or relation) which is stored in the memory 56 and which represents shift-up boundary lines indicated by solid lines in FIG. 7 and shift-down boundary lines indicated by one-dot chain lines in FIG. 7. The step-variable shifting control portion 54 generates commands (shifting commands) to be applied to the hydraulic control unit 42, to selectively engage and release the respective two hydraulically operated frictional coupling devices (except the switching clutch C0 and brake B0), for establishing the determined gear position of the automatic transmission portion 20 according to the table of FIG. 2.

The hybrid control portion 52 functions as a continuously-variable shifting control portion, and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electrically controlled continuously variable transmission, while the transmission mechanism 10 is placed in the continuously-variable shifting state, that is, while the differential portion 11 is placed in the differential state. For instance, the hybrid control portion 52 calculates a target (required) vehicle output at the present running speed V of the vehicle, on the basis of the operating amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed $N_E$ and torque $T_E$ of the engine 8, so as to obtain the calculated target engine output, and the amount of generation of the electric energy by the first electric motor M1.

The hybrid control portion 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control portion 52 determines a target value of the overall speed ratio $\gamma T$ of the transmission mechanism 10, so that the engine 8 is operated according to a stored highest-fuel-economy curve (fuel-economy map or relation) stored in memory. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control portion 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control portion 52 is basically arranged to control the throttle actuator on the basis of the operating amount $A_{CC}$ of the accelerator pedal and according to a predetermined stored relationship (not shown) between the operating amount $A_{CC}$ and the opening angle $\theta_{TH}$ of the electronic throttle valve such that the opening angle $\theta_{TH}$ increases with an increase of the operating amount $A_{CC}$.

Figure 7:
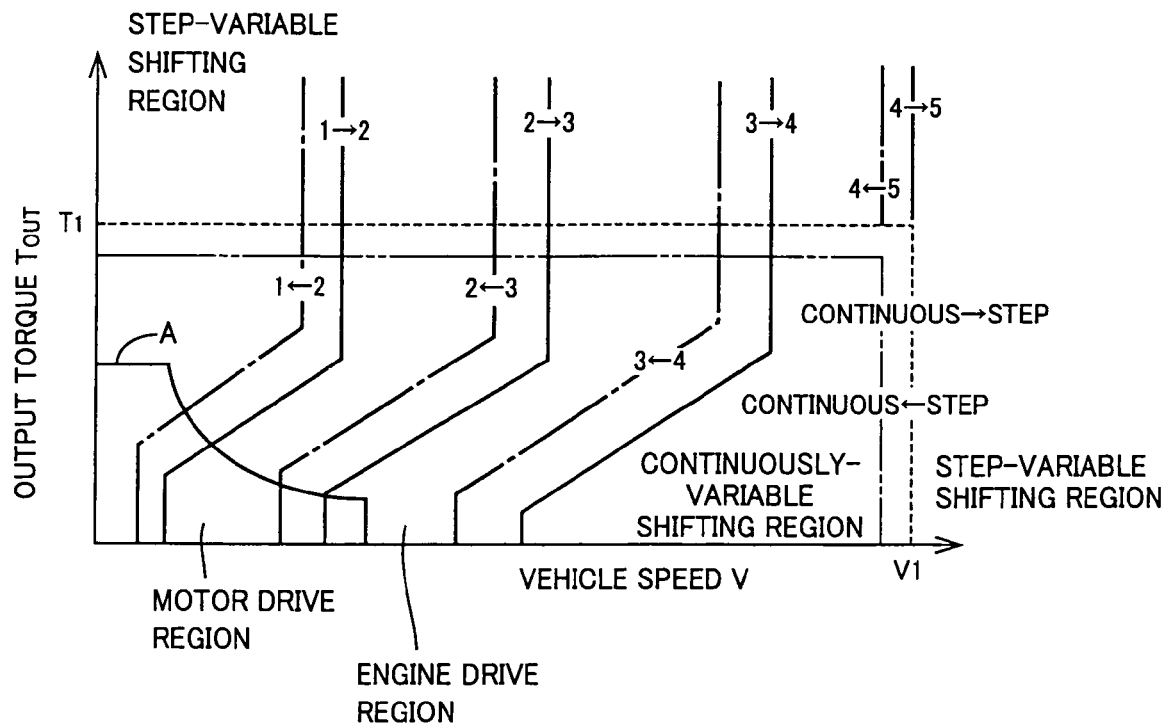
FIG. 7 is a view illustrating an example of a stored shifting boundary line map used for determining a shifting action of an automatic transmission portion, an example of a stored switching boundary line map used for switching the shifting state of the transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

Solid line A in FIG. 7 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 7 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory 56, together with the shifting boundary line map (shifting map) indicated by solid lines and one-dot chain lines in FIG. 7.

The hybrid control portion 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 7. As is understood from FIG. 7, the motor-drive mode is generally established by the hybrid control portion 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 7, as a result of an increase of the required output torque $T_{OUT}$ or engine torque $T_E$ due to an operation of the accelerator pedal, the vehicle may be started in the engine-drive mode.

The hybrid control portion 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode.

The hybrid control portion 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The high-speed-gear determining portion 62 is arranged to determine whether the gear position to which the transmission mechanism 10 should be shifted on the basis of the vehicle condition and according to the shifting boundary line map stored in the memory 56 and indicated in FIG. 7 by way of example is a high-speed gear position, for example, the fifth gear position. This determination is made by determining whether the gear position selected by the step-variable shifting control means 54 is the fifth gear position or not, for determining which one of the switching circuit C0 and brake B0 should be engaged to place the transmission mechanism 10 in the step-variable shifting state.

The differential-state switching portion 50 is arranged to selectively switch the transmission mechanism 10 between the continuously-variable shifting state and the step-variable shifting state, that is, switch the differential portion 11 between the differential state and the locked state, by engaging and releasing the switching clutch C0 and brake B0 on the basis of the vehicle condition. For example, the differential-state switching portion 50 is arranged to determine whether the shifting state of the transmission mechanism 10 (differential portion 11) should be changed, on the basis of the vehicle condition represented by the vehicle speed V and the required output torque Tour and according to the switching boundary line map (switching control map or relation) stored in the memory 56 and indicated by two-dot chain line in FIG. 7 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state.

Described in detail, when the differential-state switching portion 50 determines that the vehicle condition is in the step-variable shifting region, the differential-state switching portion 50 disables the hybrid control portion 52 to implement a hybrid control or continuously-variable shifting control, and enables the step-variable shifting control portion 54 to implement a predetermined step-variable shifting control in which the transmission portion 20 is automatically shifted according to the shifting boundary line map stored in the memory 56 and indicated in FIG. 6 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the differential-state switching portion 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the differential-state switching portion 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the differential-state switching portion 50, the differential portion 11 operable as the auxiliary transmission is placed in a selected one of two gear positions under the control of the differential-state switching portion 50 while the automatic transmission portion 20 connected in series to the differential portion 11 functions as a step-variable transmission, so that the transmission mechanism 10 as a whole functions as the so-called step-variable automatic transmission.

When the differential-state switching portion 50 has determined that the vehicle condition is in the continuously-variable shifting region for placing the transmission mechanism 10 in the continuously-variable shifting state, the differential-state switching portion 50 commands the hydraulic control unit 42 to release both of the switching clutch C0 and brake B0, for placing the differential portion 11 in the continuously-variable shifting state. At the same time, the differential-state switching portion 50 enables the hybrid control portion 52 to implement the hybrid control, and commands the step-variable shifting control portion 54 to select and hold a predetermined one of the gear positions, or to permit the automatic transmission portion 20 to be automatically shifted according to the shifting boundary line map stored in the map memory 56 and indicated in FIG. 7 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the differential-state switching portion 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 7 will be described in detail. The shifting boundary line map (shifting control map or relation) shown in FIG. 7 by way of example and stored in the memory 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 7, the solid lines indicate the shift-up boundary lines, while the one-dot chain lines indicate the shift-down boundary lines.

The broken lines in FIG. 7 represent the upper vehicle-speed limit V1 and the upper output-torque limit T1 which are used for the differential-state switching portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 7 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 7 constitute the stored switching boundary line map (switching control map or relation) used by the differential-state switching portion 50 to determine whether the vehicle condition is in the step-variable shifting region or the continuously-variable shifting region, depending upon whether the control parameters in the form of the vehicle speed V and the output torque Tour are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque Tour, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the differential-state switching portion 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The drive-force-related value indicated above is a parameter corresponding to the drive force of the vehicle, which may be the output torque $T_{OUT}$ of the automatic transmission portion 20, the engine output torque $T_E$ or the operating amount $A_{CC}$ of the accelerator pedal, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal or the operating angle of the throttle valve 96. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
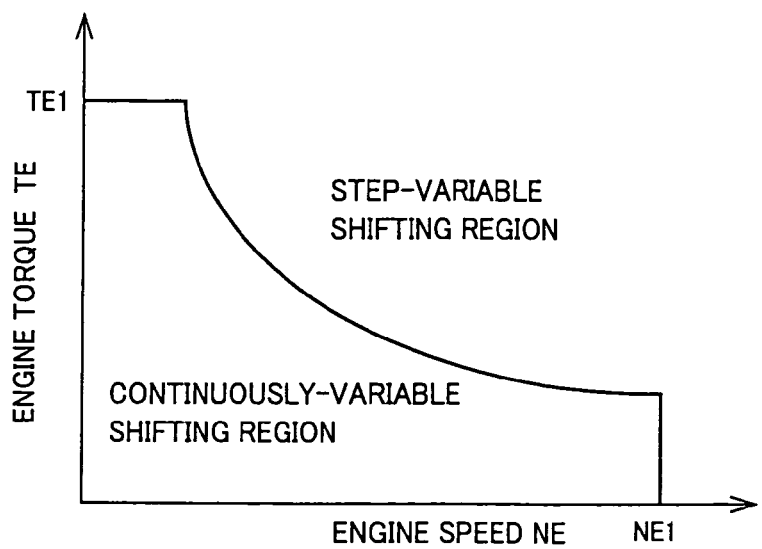
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 7.
Figure 12:
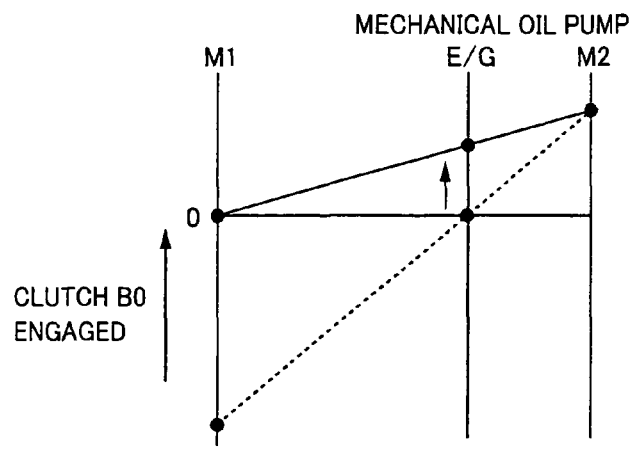
FIG. 12 is a collinear chart indicating an operation of the mechanical oil pump while a switching brake B0 is placed in an engaged state.

Referring to FIG. 8, there is shown a switching boundary line map (switching control map or relation) which is stored in the memory 56 and which defines engine-output lines serving as boundary lines used by the differential-state switching portion 50 to determine whether the vehicle condition is in the step-variable or continuously-variable shifting region. These engine-output lines are defined by control parameters in the form of the engine speed $N_E$ and the engine torque $N_T$. The differential-state switching portion 50 may use the switching boundary line map of FIG. 8 in place of the switching boundary line map of FIG. 7, to determine whether the vehicle condition is in the continuously-variable or step-variable shifting region, on the basis of the engine speed $N_E$ and engine torque $T_E$. The switching boundary line map of FIG. 7 may be based on the switching boundary line map of FIG. 8. In other words, the broken lines in FIG. 7 may be determined on the basis of the relation (map) of FIG. 8, in the two-dimensional coordinate system defined by the control parameters in the form of the vehicle speed V and the output torque $T_{OUT}$.

The step-variable shifting region defined by the switching boundary line map of FIG. 7 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque TE is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy.

The hybrid control portion 52 further functions as an oil pump control means for switching the hydraulic pressure source for supplying a pressurized oil to the hydraulic control unit 42 of the automatic transmission portion 20, between the mechanical oil pump 44 driven by the engine 8, and the electric oil pump 46 driven by an electric energy supplied from the electric-energy storage device 60. Described in detail, the mechanical oil pump 44 is operated by the engine 8 while the vehicle running condition is in the engine-drive region, that is, while the engine 8 is in operation to drive the vehicle. When the vehicle running condition is changed from the motor-drive region to the engine-drive region, the electric oil pump 46 which has been operated is stopped, and the mechanical oil pump 44 is started to function as the hydraulic pressure source for the hydraulic control unit 42. While the vehicle running condition lies in the motor-drive region, the engine 8 is held at rest so that the mechanical oil pump 44 is held at rest, while the electric oil pump 46 is operated to function as the hydraulic pressure source. It will be understood that the electric oil pump 46 and mechanical oil pump 44 respectively function as "cone oil pump" and "the other oil pump" which have been referred to in the SUMMARY OF THE INVENTION.

It is found that air stays at and around or in the vicinity of an oil inlet of the mechanical oil pump 44 during an operation of the electric oil pump 46 to deliver the pressurized oil to the hydraulic control unit 42. A subsequent operation of the mechanical oil pump 44 in the presence of the air, the air is sucked into the mechanical oil pump 44, whereby the volume of the oil within the mechanical oil pump 44 is reduced, giving rise to a risk of a delayed rise of the hydraulic pressure generated by the mechanical oil pump 44. To overcome this drawback, the air removal control portion 100 is provided to remove the air staying at and around the oil inlet of the mechanical oil pump 44, for preventing or minimizing the delay of the hydraulic pressure rise of the mechanical oil pump 44 upon starting of the mechanical oil pump 44 in place of the electric oil pump 46, that is, upon switching of the hydraulic pressure source from the electric oil pump 46 to the mechanical oil pump 44.

The air removal control portion 100 is operated to remove the air staying at and around the oil inlet of the mechanical oil pump 44, according to results of determinations made by the engine-start requirement forecasting portion 104 and the excessive-air-quantity determining portion 106, which will be described.

The motor-drive-mode determining portion 102 indicated above is configured to determine whether the vehicle is in the motor-drive mode, that is, whether the vehicle running condition is in the motor-drive region defined by the drive-power-source switching boundary line map indicated in FIG. 7. When it is determined that the vehicle running condition is in the motor-drive region, the motor-drive-mode determining portion 102 determines that the vehicle is in the motor-drive mode. In this case, the engine 8 is held at rest, and the mechanical oil pump 44 is accordingly held at rest, while the electric oil pump 46 is operated to deliver the pressurized oil to the hydraulic control unit 42.

The engine-start requirement forecasting portion 104 is configured to forecast a requirement for starting the engine 8, on the basis of the vehicle output presently required by the vehicle operator, or the present vehicle drive torque, an amount of electric energy SOC presently stored in the electric-energy storage device 60, and the present vehicle running speed V. This operation of the engine-start requirement forecasting portion 104 to forecast the requirement for starting the engine 8 is performed in the motor-drive region indicated in FIG. 7, on the basis of the accelerator operating amount $A_{CC}$ (associated with the required vehicle output, drive torque, $T_{OUT}$ and vehicle speed V) and the stored amount of electric energy SOC, and according to a predetermined forecasting line which is obtained by experimentation. When the engine-start requirement forecasting portion 104 forecasts that the engine 8 is required to be started in the near future, the engine-start requirement forecasting portion 104 determines a time length Y from the present point of time to a future point of time at which the engine 8 is commanded to be started. This length of time Y is determined on the basis of suitable parameters as indicated above and according to a predetermined relationship between the length of time Y and the parameters. This predetermined relationship is obtained by experimentation and stored in the memory 56.

The excessive-air-quantity determining portion 106 is configured to estimate the quantity of air staying at and around the oil inlet of the mechanical oil pump 44, and to determine whether the estimated quantity of air has increased to a predetermined upper limit. The quantity of the air is proportional to the amount of the oil sucked by the electric oil pump 46, and is estimated according to an equation (1) indicated in FIG. 9, wherein Qa(cc), T(s), N(t)(rpm), Qe (cc/rev) and K(min/s) respectively represent the following:

Qa(cc): Quantity of air staying at and around the oil inlet,
T(s): Time period of operation of the electric oil pump 46,
N(t)(rpm): Operating speed of the electric oil pump 46,
Qe(cc/rev): Amount of delivery of oil from the electric oil pump 46 per revolution,
K(min/s): Coefficient of air accumulation obtained by experimentation.

When the estimated air quantity Qa(cc) has increased the upper limit Qamax(cc) indicated in a formula (2) indicated in FIG. 9, the excessive-air-quantity determining portion 106 makes an affirmative determination. The upper limit Qamax obtained by experimentation is a quantity of air above which the rise of the hydraulic pressure generated by the mechanical oil pump 44 is delayed or adversely influenced by the air staying at and around the oil inlet of the mechanical oil pump 44. It is noted that a value Qe·N(t)·dt included in the equation (1) represents the amount of the oil sucked by the electric oil pump 46, and therefore the air quantity Qa is determined by the amount of the sucked oil multiplied by the coefficient K. Accordingly, the excessive-air-quantity determining portion 106 determines whether the amount of the oil sucked by the electric oil pump 46 has increased to a predetermined upper limit.

The air removal control portion 100 implements a temporary operation of the mechanical oil pump 44, more specifically, a temporary rise of the operating speed of the mechanical oil pump 44, when the affirmative determinations are obtained by all of the motor-drive-mode determining portion 102, engine-start requirement forecasting portion 104, and excessive-air-quantity determining portion 106, that is, when the motor-drive mode with the operation of the electric oil pump 44 is detected by the motor-drive-mode determining portion 102, when the requirement for starting the engine is forecasted by the engine-start requirement determining portion 104, and when an increase of the air quantity Qa to the predetermined upper limit Qamax is detected by the excessive-air-quantity determining portion 106. As a result, the air which has stayed at and around the oil inlet of the mechanical oil pump 44 is removed, and is replaced by the oil, so that the oil exists at and around the oil inlet. When the electric oil pump 46 is stopped and the engine 8 is subsequently started to start the mechanical oil pump 44, the hydraulic pressure generated by the mechanical oil pump 44 can be rapidly raised with a high response.

The temporary rise of the operating speed of the mechanical oil pump 44 is implemented by operating the engine 8 in a fuel-cut state, that is, without starting or ignition of the engine 8 in order to improve fuel economy of the vehicle and reduce the vibration of the vehicle. Described in detail, the first electric motor M1 is temporarily operated to operate the engine 8 for temporarily operating the mechanical oil pump 44. The collinear chart of FIG. 10 corresponding to that of FIG. 3 indicates an operations of the engine 8 and the mechanical oil pump 44 by the operation of the first electric motor M1. Broken line in FIG. 10 indicates a state before the temporary rise of the operating speed of the mechanical oil pump 44. In this state, the operating speed of the mechanical oil pump 44 is zero, that is, the mechanical oil pump 44 is stationary, and the second electric motor M2 is operated at the speed $N_{M2}$ corresponding to the vehicle speed V, to drive the vehicle in the motor-drive mode. When the first electric motor M1 is operated in this state, the operating speed $N_{M1}$ of the first electric motor M1 is raised as a result of the differential function of the differential portion 11, and the operating speed of the mechanical oil pump 44 (engine 8) is raised, as indicated by solid line.

The operating speed of the mechanical oil pump 44 can be raised by engaging the switching clutch C0 or brake B0, rather than by operating the first electric motor M1. The collinear chart of FIG. 11 indicates a rise of the operating speed of the mechanical oil pump 44 when the switching clutch C0 is engaged. That is, when the switching clutch C0 is fully or partially engaged, the differential function of the differential portion 11 is limited or inhibited, and the differential portion 11 is rotated as a unit, so that the operating speed of the mechanical oil pump 44 is raised to the operating speed of the second electric motor M2. The collinear chart of FIG. 13 indicates a rise of the operating speed of the mechanical oil pump 44 when the switching brake B0 is engaged. That is, when the switching brake B0 is fully or partially engaged, the differential function of the differential portion 11 is limited or inhibited, and the operating speed of the first electric motor M1 is zeroed or substantially zeroed, so that the operating speed of the mechanical oil pump 44 is raised. The switching brake B0 is engaged when the operating speed $N_{M2}$ of the second electric motor M2 is comparatively high, for example, 1500 rpm or higher. If the switching clutch C0 is engaged when the operating speed $N_{M2}$ of the second electric motor M2 is comparatively high, the durability of the switching clutch C0 may be deteriorated due to a comparatively large difference of the input and output speeds. To avoid this drawback, the switching brake B0 the input-output speed difference of which is smaller than that of the switching clutch C0 is engaged to implement the temporary rise of the operating speed of the mechanical oil pump 44.

The operating speed N1 and a predetermined time length ΔT at and during which the mechanical oil pump 44 is operated under the control of the air removal control portion 100 are suitably determined by experimentation, and stored in the memory 56. For instance, the operating speed N1 and time length ΔT are determined on the basis of the air quantity Qa estimated by the excessive-air-quantity determining portion 104 and the time length Y determined by the engine-start requirement determining portion 104, so that the air quantity Qa can be removed within the time length ΔT.

Figure 13:
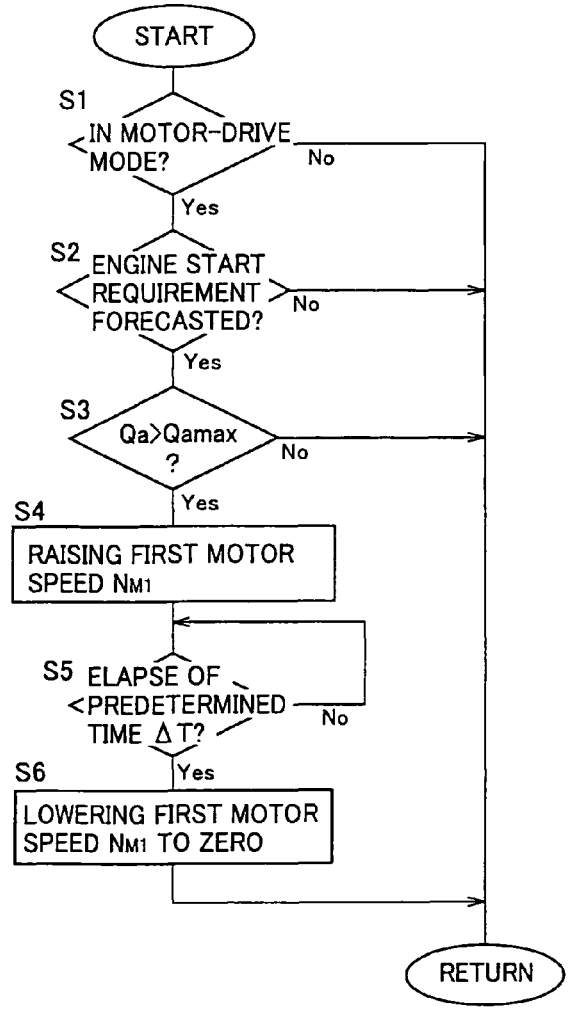
FIG. 13 is a flow chart illustrating a major control operation of the electronic control device of FIG. 4, that is, a control routine to remove air staying at and around an oil inlet of the mechanical oil pump.

Referring to the flow chart of FIG. 13, there will be described a control routine executed by the electronic control device 40 to remove the air staying at and around the oil inlet of the mechanical oil pump 44. This control routine is repeatedly executed with an extremely short cycle time of about several milliseconds to several tens of milliseconds. The time chart of FIG. 14 indicates changes of various parameters of the transmission mechanism 10 when the control routine of FIG. 13 is executed to remove the air from the mechanical oil pump 44.

The control routine is initiated with step S1 corresponding to the motor-drive-mode determining portion 102, to determine whether the vehicle running in the motor-drive mode, that is, whether the vehicle running condition is in the motor-drive region defined by the drive-power-source switching boundary line map shown in FIG. 7. If a negative determination is obtained in step S1, the present control routine is terminated. If an affirmative determination is obtained in step S1, the control flow goes to step S3 corresponding to the engine-start requirement forecasting portion 104, to determine whether the engine 8 is required to be started in the near future. A negative determination is obtained in step S2 indicates that it is not necessary to temporarily operate the mechanical oil pump 44 for removing the air. In this case, the control routine is terminated. If an affirmative determination is obtained in step S2, that is, if the engine-start requirement is forecasted, the control flow goes to step S3 corresponding to the excessive-air-quantity determining portion 106, to determine whether the estimated quantity Qa of the air staying at and around the oil inlet of the mechanical oil pump 44 has increased to the upper limit Qamax. A negative determination is obtained in step S3 indicates that it is not necessary to temporarily operate the mechanical oil pump 44. In this case, the control routine is terminated. If an affirmative determination is obtained in step S3, that is, if the estimated quantity Qa has increased to the upper limit Qamax, the control flow goes to step S4 corresponding to the air removal control portion 100, in which the first electric motor M1 is operated such that its operating speed $N_{M1}$ is temporarily raised, for starting the mechanical oil pump 44.

Figure 14:
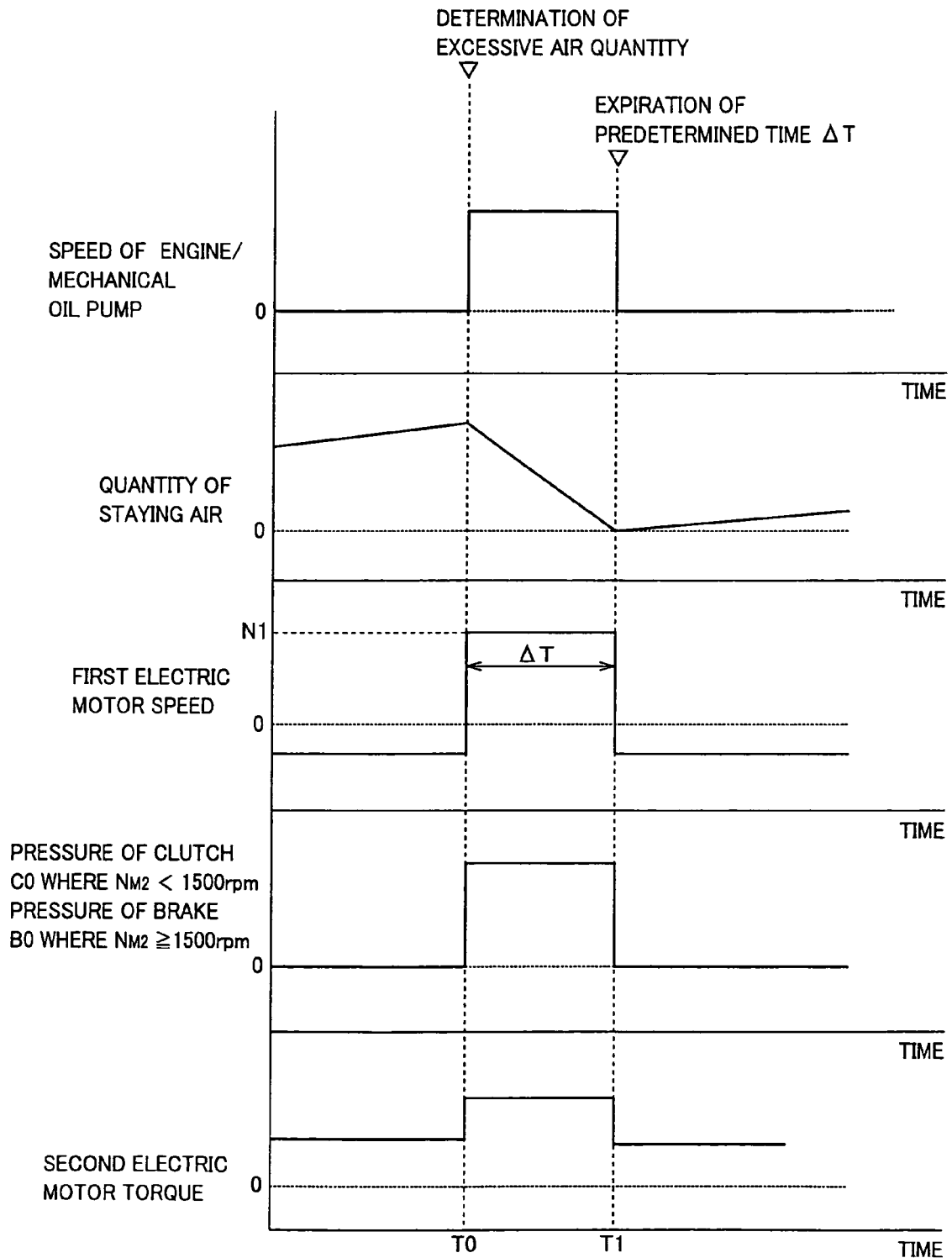
FIG. 14 is a time chart indicating changes of various parameters of the transmission mechanism when the control routine of FIG. 13 is executed to remove the air from the mechanical oil pump.

The temporary rise of the operating speed $N_{M1}$ of the first electric motor M1 to a value N1 is initiated at a point of time T0 indicated in the time chart of FIG. 14. As a result, the operating speeds of the engine 8 and the mechanical oil pump 44 connected to the engine 8 are raised in synchronization with the rise of the operating speed $N_{M1}$ of the first electric motor M1. Then, the control flow goes to step S5 also corresponding to the air removal control portion 100, to determine whether the predetermined time length ΔT has elapsed. The time length ΔT from the point of time T0 expires at a point of time T1 also indicated in the time chart of FIG. 14. The temporary rise of the operating speed $N_{M1}$ of the first electric motor M1 in step S4 is maintained as long as a negative determination is obtained in step S5, so that the operating speed $N_{M1}$ of the first electric motor M1 is held at N1 for the predetermined time length ΔT, whereby the mechanical oil pump 44 is kept operated for the predetermined time length ΔT. Accordingly, the air staying at and around the oil inlet of the mechanical oil pump 44 is gradually sucked, and the air quantity Qa is gradually reduced. As described above, the operating speed of the mechanical oil pump 44 can be raised by engaging the switching clutch C0 or switching brake B0, rather than by operating the first electric motor M1.

The temporary rise of the operating speed of the mechanical oil pump 44 by operation of the first electric motor M1 or by engagement of the switching clutch C0 or brake B0 causes a passive operation of the engine 8, namely, a dragging of the engine 8, which causes a power loss by which the vehicle drive force transmitted from the second electric motor M2 to the automatic transmission portion 20 is reduced. To compensate for this reduction of the vehicle drive force, the output torque of the second electric motor M2 may be increased for the predetermined time length ΔT, as indicated in the time chart of FIG. 14. If the predetermined time length ΔT has elapsed, that is, if an affirmative determination indicating that the air quantity Qa has been zeroed is obtained in step S5, the control flow goes to step S6 also corresponding to the air removal control portion 100, in which the operating speed $N_{M1}$ of the first electric motor M1 is lowered to zero, to stop the temporary operation of the mechanical oil pump 44. It is noted that the fuel economy of the vehicle is deteriorated with an increase of the length of operation of the first electric motor M1, so that the length of operation of the first electric motor M1 is preferably minimized to an extent that permits sufficient removal of the air.

Where the time length Y is extremely short, the engine 8 may be started before the air is removed from the oil inlet of the mechanical oil pup 44 under the control of the air removal control portion 100. In this case, the mechanical oil pump 44 may be operated in the presence of some quantity of air at and around the oil inlet. In view of this possibility, the electric oil pump 46 is preferably operated concurrently with the mechanical oil pump 44, even after the starting of the engine 8, until the air has been fully removed from the mechanical oil pump 44.

The electronic control device 40 in the illustrated embodiment, which functions as the vehicular oil pump control apparatus, is configured such that the mechanical oil pump 44 is temporarily operated for the predetermined time length ΔT under the control of the air removal control portion 100, during an operation of the electric oil pump 46, so that the air staying at and around the oil inlet of the mechanical oil pump 44 is removed. Accordingly, the hydraulic pressure generated by the mechanical oil pump 44 after stopping of the electric oil pump 46 and starting of the mechanical oil pump 44 can be rapidly raised with a high degree of response.

The electronic control device 40 is further configured such that the temporary rise of the operating speed of the mechanical oil pump 44 is initiated when the amount of the oil sucked by the electric oil pump 46 in operation has reached the predetermined value, that is, the quantity of the air staying at and around the oil inlet of the mechanical oil pump 44 has increased to the predetermined value. In this respect, it is noted that the quantity of the air staying at and around the oil inlet of the mechanical oil pump 44 can be estimated on the basis of the amount of the oil sucked by the electric oil pump 46. The electronic control device 40 permits efficient removal of the air.

The electronic control device 40 is arranged to estimate the quantity of the air staying at and around the oil inlet of the mechanical oil pump 44 on the basis of the amount of the oil sucked by the electric oil pump 46 driven by the electric energy.

The electronic control device 40 is further configured to temporarily raise the operating speed of the mechanical oil pump 44 to remove the air staying at and around its oil inlet.

The electronic control device 40 is further configured to initiate the temporary rise of the operating speed of the mechanical oil pump 44 to remove the air staying at and around its oil inlet, when the engine-start requirement is forecasted by the engine-start requirement forecasting portion 104, that is, before the engine 8 is started. Accordingly, the hydraulic pressure generated by the mechanical oil pump 44 can be rapidly raised immediately after starting of the mechanical oil pump 44.

The electronic control device 40 is also arranged such that the mechanical oil pump 44 is temporarily operated by the engine 8 which is operated by the first electric motor M1, without starting of the engine 8, that is, in a fuel-cut state of the engine 8.

The electronic control device 40 is further configured such that the mechanical oil pump 44 is temporarily operated by the engine 8 which is operated by the first electric motor M1 under the control of the differential limiting device in the form of the switching clutch C0 and brake B0, without starting of the engine 8.

While the preferred embodiment of the control apparatus of this invention has been described in detail by reference to the accompanying drawings, it is to be understood that the present invention may be otherwise embodied.

In the illustrated embodiment, the torque of the second electric motor M2 is increased during an operation of the mechanical oil pump 44. However, the increase of the torque of the second electric motor M2 is not essential. Namely, the torque of the second electric motor M2 may be held at a value prior to the operation of the mechanical oil pump 44.

The illustrated embodiment is arranged such that the air removal control portion 100 is operated to implement a temporary rise of the operating speed $N_{M1}$ of the first electric motor M1, when the requirement for starting the engine 8 is forecasted by the engine-start requirement forecasting portion 104. However, the air removal control portion 100 may be operated at a predetermined time interval, irrespective of whether the engine 8 is expected to be started.

Although the second electric motor M2 is connected directly to the power transmitting member 18 in the illustrated transmission mechanism 10, the second electric motor M2 may be connected to any portion of the power transmitting path between the differential portion 11 and the drive wheels 34, either directly or indirectly through a power transmitting device, for example.

While the differential portion 11 functions as an electrically controlled transmission the gear ratio γ0 of which is continuously variable between the minimum value γ0min and the maximum value γ0max, the differential portion 11 may be controlled such that its speed ratio γ0 is variable non-continuously or in steps by utilizing the differential function.

In the power distributing mechanism 16 described above, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed or connected to any other elements selected from the three elements CA1, S1 and R1 of the first planetary gear set 24, either directly or through a clutch or planetary gear.

In the illustrated transmission mechanism 10, the engine 8 is connected directly to the input shaft 14. However, the engine 8 may be operatively connected to the input shaft 14 through gears, a belt or any other power transmitting device. The engine 8 and the input shaft 14 need not be disposed coaxially.

In the illustrated transmission mechanisms 10, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears, belts or a speed reduction gear device.

In the illustrated transmission mechanism 10, the automatic transmission portion 20 is connected in series with the differential portion 11 through the power transmitting member 18. However, the automatic transmission portion 20 may be mounted on and disposed coaxially with a counter shaft which is parallel to the input shaft 14. In this case, the differential portion 11 and the automatic transmission portion 20 are operatively connected to each other through a suitable power transmitting device or a set of two power transmitting members such as a pair of counter gears, and a combination of a sprocket wheel and a chain.

The illustrated power distributing mechanism 16 provided as a differential mechanism in the illustrated transmission mechanism 10 may be replaced by a differential gear device including a pinion rotated by the engine, and a pair of bevel gears which are respectively operatively connected to the first and second electric motors M1, M2.

While the illustrated power distributing mechanism 16 is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets 24 which is of the single-pinion type may be replaced by a double-pinion type planetary gear set. Where the power distributing mechanism 16 is constituted by two or more planetary gear sets, the engine 8, first and second electric motors M1, M2 and power transmitting member 18 are connected to selected ones of the rotary elements of those planetary gear sets, such that the power distributing mechanism 16 is selectively placed in the step-variable or continuously-variable shifting state by selectively engaging and releasing the clutches C and brakes B that are connected to the rotary elements.

While the engine 8 and the differential portion 11 are connected directly each other in the illustrated transmission mechanism 10, a clutch may be disposed between the engine 8 and the differential portion 11.

It is to be understood that the present invention may be embodied with various other changes and modifications which may occur to those skilled in the art, without departing from the spirit and scope of the invention defined in the appended claims.

What is claimed is:

1. A control apparatus for controlling two oil pumps which are provided on a vehicle, the two oil pumps being selectively driven by respective different drive power sources such that a first oil pump is operated while a second oil pump is held at rest, the control apparatus comprising:

an air removal control portion configured to temporarily operate the second oil pump during an operation of the first oil pump, to remove air staying at and around an oil inlet of the second oil pump, the air removal control portion configured to initiate a temporary rise of an operating speed of the second oil pump when an amount of an oil sucked by the first oil pump reaches a predetermined value, the predetermined value being determined by estimating a predetermined amount of the air that has stayed at and around the oil inlet of the second oil pump.

2. A control apparatus for controlling two oil pumps which are provided on a vehicle, the two oil pumps being selectively driven by respective different drive power sources such that a first oil pump is operated while a second oil pump is held at rest, the control apparatus comprising:

an air removal control portion configured to temporarily operate the second oil pump during an operation of the first oil pump, to remove air staying at and around an oil inlet of the second oil pump, the second oil pump being a mechanical oil pump driven by an engine of the vehicle;

the vehicle including an electrically controlled differential portion having an input shaft, an output shaft, a differential mechanism operatively connected to the engine, and an electric motor which is operatively connected to a rotary element of the differential mechanism and an operating state of which is controlled to control a differential state between rotating speeds of the input and output shafts; and the air removal control portion being configured to operate the electric motor to raise an operating speed of the mechanical oil pump by operating the engine without starting the engine.

3. The control apparatus according to claim 2, further comprising an engine-start requirement forecasting portion configured to forecast a requirement for starting the engine, wherein the air removal control portion initiates a temporary rise of the operating speed of the mechanical oil pump when said engine-start requirement forecasting portion forecasts the requirement.

4. The control apparatus according to claim 2, wherein said differential mechanism is provided with a differential limiting device operable to limit or inhibit a differential function of the differential mechanism, and said air removal control portion is configured to enable said differential limiting device to operate for raising the operating speed of the mechanical oil pump.

5. The control apparatus according to claim 3, wherein said differential mechanism is provided with a differential limiting device operable to limit or inhibit a differential function of the differential mechanism, and said air removal control portion is configured to enable said differential limiting device to operate for raising the operating speed of the mechanical oil pump.

* * * * *